US00RE47585E

(19) United States
(12) Reissued Patent
Peterson et al.

(10) Patent Number: US RE47,585 E
(45) Date of Reissued Patent: Aug. 27, 2019

(54) SYSTEM AND METHOD FOR MIGRATING AGENTS BETWEEN MOBILE DEVICES

(71) Applicant: OL SECURITY LIMITED LIABILITY COMPANY, Dover, DE (US)

(72) Inventors: Robert W. Peterson, Plano, TX (US); Mark Gerard, Plano, TX (US)

(73) Assignee: OL SECURITY LIMITED LIABILITY COMPANY, Wilmington, DE (US)

(21) Appl. No.: 15/441,140

(22) Filed: Feb. 23, 2017

Related U.S. Patent Documents

Reissue of:
(64) Patent No.: 8,965,408
Issued: Feb. 24, 2015
Appl. No.: 14/252,670
Filed: Apr. 14, 2014

U.S. Applications:
(62) Division of application No. 12/629,926, filed on Dec. 3, 2009, now Pat. No. 8,744,490.

(51) Int. Cl.
*H04W 24/00* (2009.01)
*G06F 9/48* (2006.01)
*H04L 29/08* (2006.01)

(52) U.S. Cl.
CPC ..... *G06F 9/4862* (2013.01); *H04L 67/18* (2013.01)

(58) Field of Classification Search
CPC ..... H04W 24/00; G06F 9/4862
USPC ..... 455/456.3
See application file for complete search history.

(56) References Cited

U.S. PATENT DOCUMENTS

| | | | | |
|---|---|---|---|---|
| 6,078,826 | A | 6/2000 | Croft | |
| 6,212,390 | B1 * | 4/2001 | Rune | 455/456.6 |
| 6,219,669 | B1 * | 4/2001 | Haff | H04L 29/06 |
| 6,646,559 | B2 * | 11/2003 | Smith | G01W 1/02 340/601 |
| 7,020,476 | B2 | 3/2006 | Day et al. | |
| 7,072,672 | B1 * | 7/2006 | Vanska et al. | 455/456.3 |

(Continued)

FOREIGN PATENT DOCUMENTS

| | | |
|---|---|---|
| EP | 1596300 | 11/2005 |
| EP | 1919146 | 5/2008 |

(Continued)

OTHER PUBLICATIONS

Schwabe Williamson & Wyatt; Related Case Listing; Portland, OR; Aug. 17, 2018; 1 Page.

(Continued)

*Primary Examiner* — Catherine M Tarae
(74) *Attorney, Agent, or Firm* — Schwabe, Williamson & Wyatt

(57) ABSTRACT

Mobile agents can be deployed to location aware mobile devices within specific regions of interest to achieve specific goals in respect of events occurring in the region of interest. In order to ensure that the agent can persist within the region of interest until the agent goals are achieved, the agent is configured to locate other devices within the region of interest and to propagate itself, by moving or copying itself, to those other devices. When a device hosting the agent exits the region of interest, the agent is terminated, thereby freeing device resources.

35 Claims, 6 Drawing Sheets

(56) References Cited

U.S. PATENT DOCUMENTS

| | | | | |
|---|---|---|---|---|
| 7,127,613 | B2 * | 10/2006 | Pabla | H04L 9/0838 713/171 |
| 7,168,089 | B2 * | 1/2007 | Nguyen | G06F 21/10 380/251 |
| 7,221,750 | B2 | 5/2007 | Brahmbhatt et al. | |
| 7,295,831 | B2 | 11/2007 | Coleman et al. | |
| 7,346,338 | B1 | 3/2008 | Calhoun et al. | |
| 7,448,073 | B2 | 11/2008 | Rosenberger | |
| 7,584,470 | B2 * | 9/2009 | Barker | G06F 8/61 717/168 |
| 7,637,810 | B2 * | 12/2009 | Amaitis | G06Q 20/3224 340/993 |
| 7,761,538 | B2 * | 7/2010 | Lin | G06F 9/5061 709/220 |
| 8,104,073 | B2 | 1/2012 | Hanna | |
| 8,171,468 | B2 * | 5/2012 | Larsson | H04M 1/72525 717/173 |
| 8,225,379 | B2 | 7/2012 | vandeGroenendaal | |
| 8,256,003 | B2 | 8/2012 | Dadhia et al. | |
| 8,522,020 | B2 | 8/2013 | Gerard | |
| 8,744,490 | B2 | 6/2014 | Petersen | |
| 9,338,123 | B2 * | 5/2016 | Frazier | G06F 17/30041 |
| 2003/0041238 | A1 * | 2/2003 | French | H04L 29/06 713/153 |
| 2003/0064731 | A1 | 4/2003 | Angelo | |
| 2004/0088348 | A1 * | 5/2004 | Yeager et al. | 709/202 |
| 2004/0121787 | A1 | 6/2004 | Day et al. | |
| 2005/0037733 | A1 | 2/2005 | Coleman et al. | |
| 2005/0172153 | A1 | 8/2005 | Groenendaal | |
| 2006/0048141 | A1 * | 3/2006 | Persson | G06F 8/61 717/176 |
| 2006/0116170 | A1 | 6/2006 | Brahmbhatt et al. | |
| 2006/0165030 | A1 | 7/2006 | Fox | |
| 2006/0200862 | A1 | 9/2006 | Olson et al. | |
| 2007/0079113 | A1 | 4/2007 | Kukarni et al. | |
| 2007/0171859 | A1 | 7/2007 | Brahmbhatt et al. | |
| 2007/0266169 | A1 | 11/2007 | Chen et al. | |
| 2007/0291945 | A1 | 12/2007 | Chuang et al. | |
| 2007/0294747 | A1 | 12/2007 | Rosenberger | |
| 2008/0268816 | A1 | 10/2008 | Wormald | |
| 2008/0282347 | A1 | 11/2008 | Dadhia et al. | |
| 2009/0041252 | A1 | 2/2009 | Hanna | |
| 2009/0061890 | A1 | 3/2009 | Andreasson | |
| 2009/0172821 | A1 | 7/2009 | Daira et al. | |
| 2009/0215402 | A1 | 8/2009 | Ng | |
| 2010/0024009 | A1 | 1/2010 | Comay et al. | |
| 2011/0116442 | A1 | 5/2011 | Caldwell et al. | |
| 2011/0136510 | A1 | 6/2011 | Peterson | |
| 2011/0138443 | A1 | 6/2011 | Gerard | |
| 2014/0274133 | A1 | 9/2014 | Peterson | |

FOREIGN PATENT DOCUMENTS

| | | |
|---|---|---|
| JP | 2001-320778 | 11/2001 |
| JP | 2003-271390 | 9/2003 |
| JP | 2004-302959 | 10/2004 |
| JP | 2004-364076 | 12/2004 |
| JP | 2008-131594 | 6/2008 |
| TW | 569586 | 4/2001 |
| WO | 2086714 | 10/2002 |
| WO | 2006130845 | 12/2006 |
| WO | 2009027109 | 3/2009 |
| WO | 2011068626 | 6/2011 |

OTHER PUBLICATIONS

Stolowitz Ford Cowger LLP; Related Case Listing; Portland, OR; Apr. 9, 2014; 1 Page.

European Patent Office, The Hague; EP Extended Search Report EP application 10193300.4; Feb. 16, 2011; 9 Pages.

European Patent Office; IB International Preliminary Report on Patentability and Written Opinion of the ISA, PCT/US2010/055651; Jun. 14, 2012; 8 pages.

Satoh I, "Linking Physical Worlds to Logical Worlds with Mobile Agents"; Mobile Data Management, Proceedings, 2004 IEEE International Conference, Berkeley, CA US; Jan. 19, 2004; pp. 332-343.

European Patent Office; International Searching Authority; PCT/US2010/055651; International Search Report and Written Opinion; Feb. 16, 2011; 13 pages.

* cited by examiner

SYSTEM AND METHOD FOR MIGRATING AGENTS BETWEEN MOBILE DEVICES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application is *a reissue of U.S. application Ser. No. 14/252,670, filed Apr. 14, 2014, now U.S. Pat. No. 8,965, 408, which is* a divisional of and claims priority benefit to U.S. patent application Ser. No. 12/629,926, filed Dec. 3, 2009, [issued as] *now* U.S. Pat. No. 8,744,490, [all] *each* of which is incorporated herein in its entirety.

FIELD OF THE INVENTION

This disclosure relates to the deployment and execution of agents to mobile devices.

BACKGROUND OF THE INVENTION

In mobile communications, mobile devices may be configured to receive and support mobile agents for performing various tasks. However, the value of a ubiquitous network of mobile sensory input has yet to be leveraged in the marketplace. Today, there is an increase in low cost, low power micro-electronics, sensors and wireless technologies. For example, the user of a location-aware mobile device may encounter or identify a real-world event. The user can choose to download and execute an intelligent agent-based software application to the mobile device to achieve a specific goal with or for the user.

The user will need to eventually leave the event or have some other need that requires termination of the Agent on the device. This could happen before the Agent goal is completed. In prior art applications, this will typically mean that the agent software is not able to continue to achieve its goal.

What is required is an improved system and method that enables mobile agents to persist.

SUMMARY OF THE INVENTION

In one aspect of the disclosure, there is provided a method for deploying an agent to a mobile device comprising defining a region of interest (ROI), deploying an agent to a first mobile device, executing the agent on the first mobile device within the region of interest, and propagating the agent from the first mobile device to at least one second mobile device within the region of interest.

In one aspect of the disclosure, there is provided a server configured to deploy an agent application to at least one mobile device. The agent application may be configured to execute on the at least one mobile device when the at least one mobile device is within a region of interest, perform at least one agent function with respect to the region of interest, locate at least one other mobile device within the region of interest, and replicate the agent on the at least one other mobile device within the region of interest.

In one aspect of the disclosure, there is provided a computer-readable medium comprising computer-executable instructions for execution by a first processor of a first device, that, when executed, cause the first processor to execute an agent application, receive an agent participation request from a second processor of a second device, the agent participation request indicating a location of the second device, compare the location of the second device to a definition of a region of interest and provide the agent application to the second processor if the second device is within the region of interest.

BRIEF DESCRIPTION OF THE DRAWINGS

Reference will now be made, by way of example only, to specific embodiments and to the accompanying drawings in which.

DETAILED DESCRIPTION OF THE INVENTION

Figure 1:
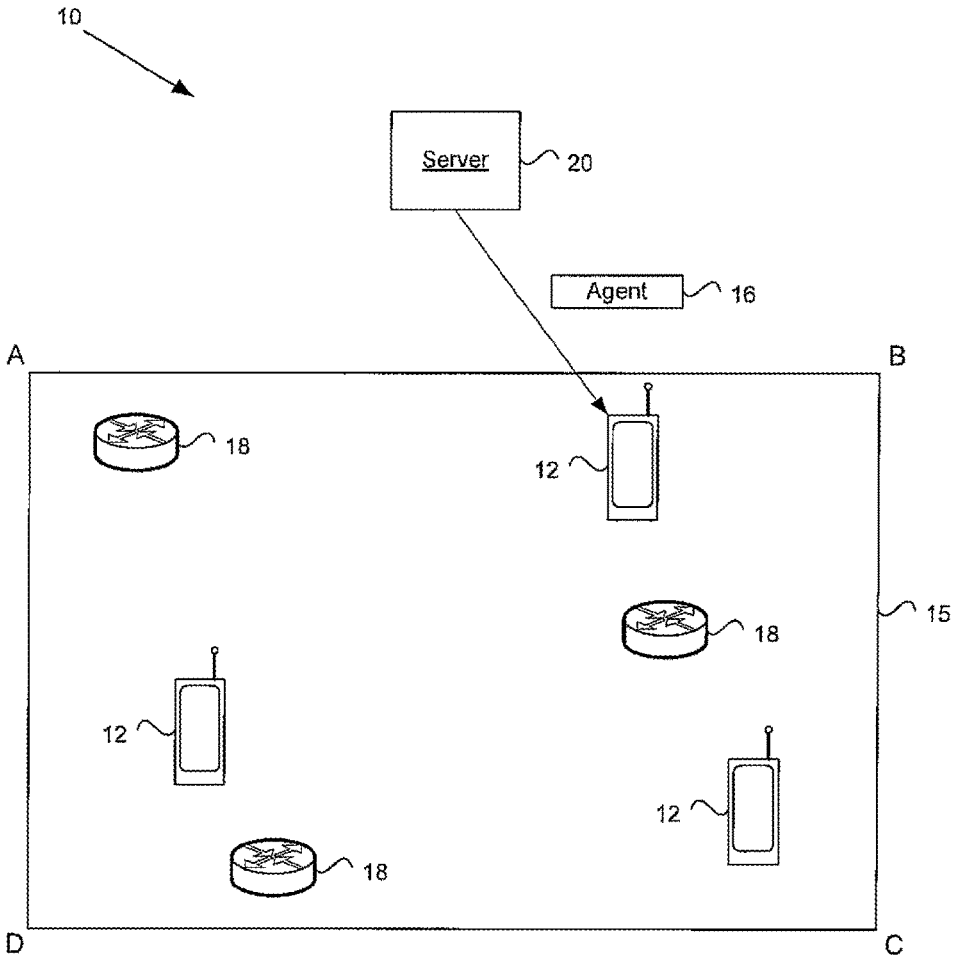
FIG. 1 illustrates a network serving a region of interest.

In FIG. 1, there is shown a network 10 that includes a server 20 and any number of mobile devices 12. The mobile devices may communicate with the server 20 through any suitable communications protocol. The network 10 supports peer-to-peer communication but otherwise, the state or type of the network is not relevant to the essence of the disclosure. The mobile devices 12 may communicate with the server 20 and with each other through one or more base stations 18. Typically, the devices 12 may be of many types including cellular phones, personal digital assistants (PDA), netbooks, laptops, and the like.

The mobile devices 12 are generally configured to support dynamic, executable content through the network and may receive content from the server 20. In particular, the server 20 may deploy an agent application 16 to a mobile device 12, for example in response to a request from the device 12. As described above, agents 16 may be made applicable to particular events within a region of interest. The server 20 is thus able to define a boundary of the region of interest in order to characterize where the event is taking place. In one embodiment, the region of interest may be defined by a series of latitude/longitude points or some similar array of coordinates. Alternatively, a region of interest may be defined as being within communication range of a particular base station 18 or set of base stations.

In the present embodiments, the agent 16 may require its host device to be location aware. Awareness of location may be determined by an in-built system, such as a GPS or similar, which is able to provide the device with its present location to a required degree of accuracy. Alternatively or in addition, a device may be location aware by receiving information from the server or via communications with the base stations 18.

A user at a mobile device 12 is able to download an agent 16 from the server 20 and to execute the agent 16 on the device 12 in order to achieve a particular goal. The goal may be in respect of a particular event occurring within a region of interest 15 covered by the network 10. Examples of applications and goals of the agent are provided in more detail below.

As described above, there can be contention when the user needs to leave the ROI or have some other need that requires termination of the agent on the device before the goals of the agent have been achieved. In order to strike a balance between the user's needs and the agent's needs on the device, the agent software should be deployed so that it is able to persist its presence within the ROI to service others who enter the ROI.

Figure 2:
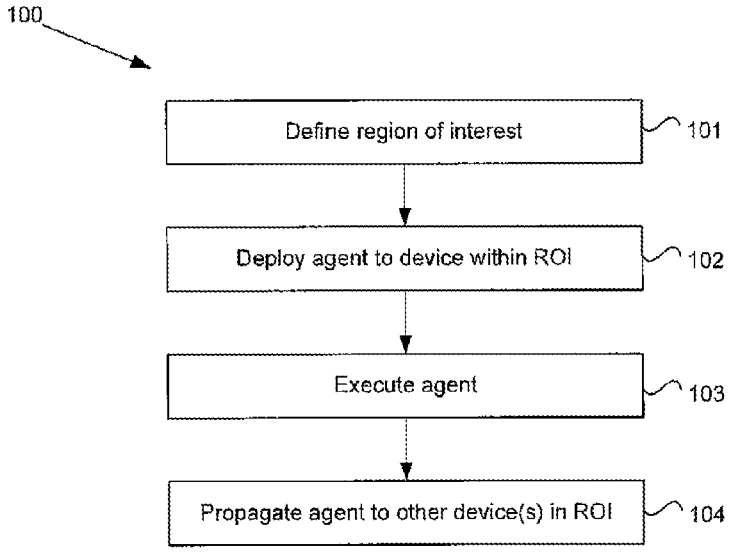
FIG. 2 illustrates a process for deploying a mobile agent into the region of interest.

A method for deployment of the agent into the ROI is illustrated in the flowchart 100 of FIG. 2. At step 101, an ROI is defined for a particular agent application 16. The agent application 16 is then deployed to at least one mobile device 12 (step 102), for example in response to a request from the mobile device 12. The agent then executes (step 103) and as part of the execution of the agent, the agent may propagate itself to one or more other agents within the ROI (step 104), thereby ensuring that the agent can persist until the agent functions are completed.

Initially, the mobile device need not be in the ROI when it receives the agent but when the device 12 moves into the ROI the agent will detect that the device is within the event boundaries and begin execution. Similarly, when the device 12 leaves the event boundary defined by the ROI, the agent may terminate or place itself into a stand-by mode.

Agent propagation may occur by moving or copying the Agent between participating devices within the ROI. In either scenario, the Agent's motivation is to remain actively executing within the ROI. This serves to flood the ROI with Agents that act independently from each other and function toward the same goal.

Figure 4:
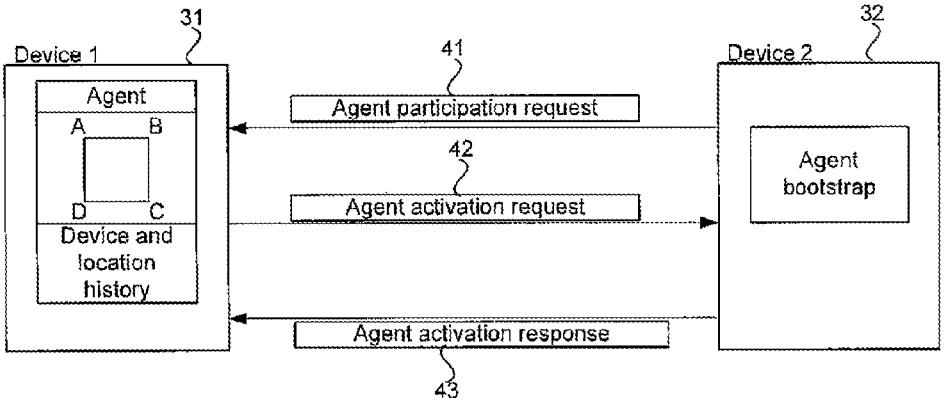
FIG. 4 illustrates a message flow when a device copies an agent to a second device.
Figure 3:
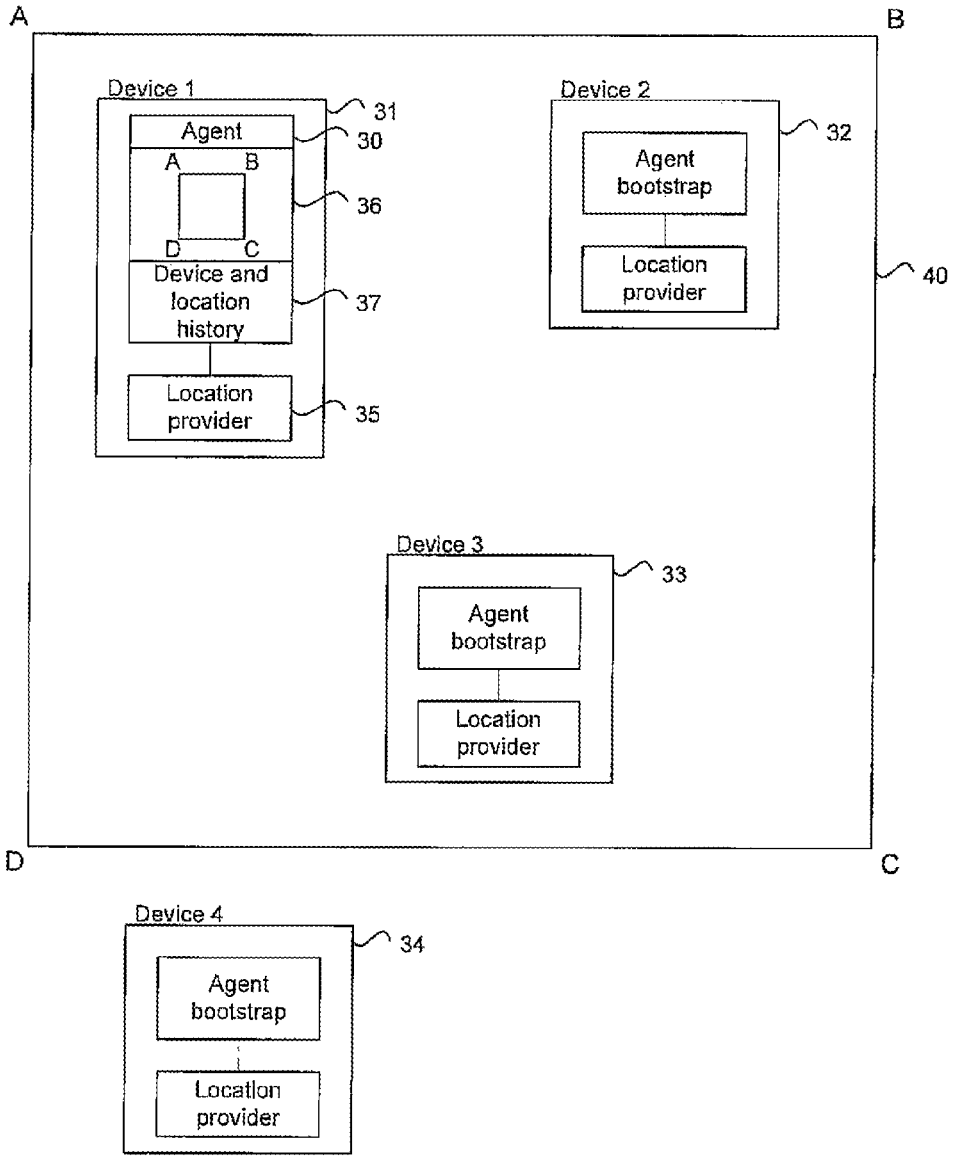
FIG. 3 illustrates a state of the network of FIG. 1 with a device executing an agent application.
Figure 5:
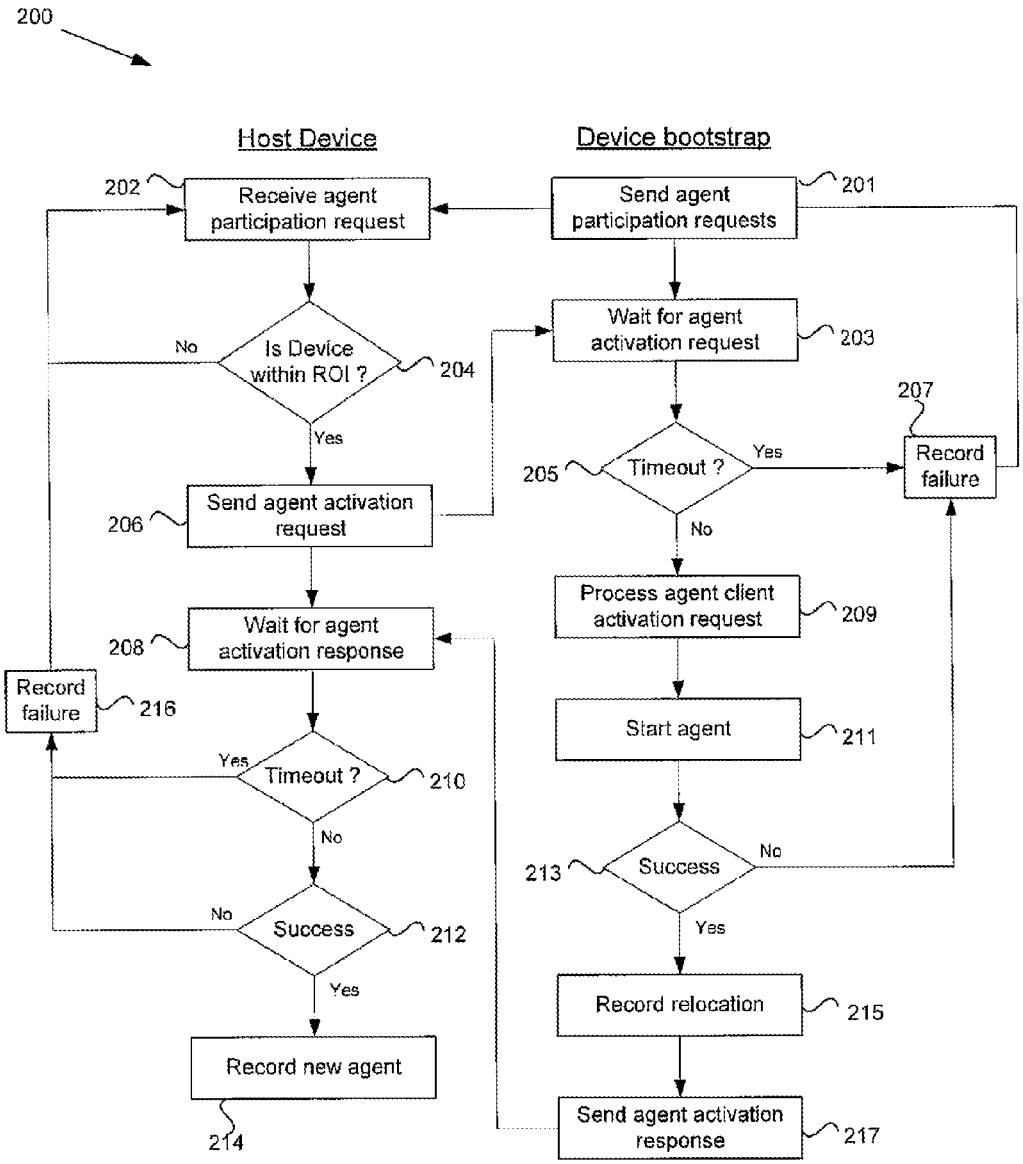
FIG. 5 illustrates a process for copying an agent from a first device to a second device.

Copying of the agent will now be described with reference to FIGS. 3 to 5. FIG. 3 illustrates a state of the network 10, FIG. 4 illustrates communications between two devices during the copying and the process is shown in the flowchart 200 of FIG. 5. In FIG. 3, an ROI 40 is defined with a nominal boundary as depicted. Device_1 31, Device_2 32 and Device_3 33 are operating within the geographic limits of the ROI 40 while Device_4 34 is operating outside of the ROI 401. It is considered that each of the devices 31-34 is capable of supporting agent applications and thus each executes the agent bootstrap code. In addition, each of the devices 31-34 is considered to be location aware by respective location providers of the devices 31-34. The network connectivity may be via Internet Protocols or may be isolated from the Internet with the type and state of the connectivity being largely irrelevant for the purposes of the present disclosure.

At commencement, it is considered that Device_1 has had an agent 30 deployed to it, either from the server 20 (FIG. 1) or from other prior devices within the ROI. The agent includes an ROI definition 36 as well as a device and location history of the agent 37.

Devices 32-34 which are executing the agent bootstrap code send participation requests (step 201), e.g. by broadcast, multicast or by direct communication to receptive devices, and then wait for agent activation requests (step 203). The agent participation request 41 provides the device identity and the current location of the device. At step 202, Device_1 31, which is currently hosting the agent 30, receives agent participation requests 41 from the various other devices 32-34. At step 204, Device_1 31 determines from the agent participation request whether the requesting device is within the ROI 40. For example, the agent on Device_1 would compare the location of Device_4 34 indicated in an agent participation request with the ROI defined within the agent 36 and determine that Device_4 34 is outside of the region of interest 40. In this case, the agent would return to step 202 and await a next agent participation request. Processing of an agent participation request from Device_2 32 however would show that Device_2 is located in the ROI and thus the agent 30 would proceed to step 206 and send an agent activation request 42 to Device_2 32. The agent activation request would return the device ID of Device_2 as well as an agent ID and a serialized version of the agent including both a definition of the ROI and a location of device history of the agent. Device_1 would then proceed to step 208 and await an agent activation response. At Device_2 32, if a timeout occurs (step 205) while awaiting the agent activation request, a failure is recorded (step 207) and Device_2 32 returns to step 201 to send another agent participation request. Otherwise, if no timeout occurs, the agent activation request is processed (step 209). That is, the agent is deserialized and activated and the ROI and agent history is stored prior to starting the agent (step 211). If the agent cannot be successfully started as determined at step 213, then a failure is recorded 207 and Device_2 32 returns to step 201. Otherwise, the copying of the agent is recorded (step 215), e.g. by adding Device_2 32 to the location and device history. Device_2 32 then sends an agent activation response 43 to Device_1 31 which indicates the device ID of Device_2 32, the agent ID and a success or fail indicator.

If Device_1 31 receives the agent activation response 43 before a timeout (step 210) and the agent activation response 43 indicates that the agent has been successfully started on Device_2 (step 212), then agent on Device_1 records the new agent (step 214). Otherwise, the agent on Device_1 records a failure (step 216).

At the conclusion of the process 200, the agent is actively executing on Device_1 31 and on Device_2 32. Either of Device_1 or Device_2 may then continue replicating the agent to other devices within the ROI, such as Device_3 33 following the process as described above.

The agent ID identifies the agent, and may be used by Device_2 to determine if the agent is already available on the device. If Device_2 doesn't have an agent with a matching agent ID, Device_2 must retrieve the correct agent from an external source, e.g., Device_1.

As an alternative to copying the agent, the agent 30 may be configured to move from one device to another. The process for moving may be similar to the process 200 shown in FIG. 5. However, the step of recording the new agent (step 214) may be replaced with the step of terminating the agent on the host device, i.e. Device_1, once indication of a successful activation on Device_2 is received.

Copying or moving of the agent may be triggered by the receipt of an agent activation request from another device within the ROI. Alternatively or in addition, the host device may only become receptive to moving or copying the agent under certain conditions, such as when the device is being shut down, low battery power conditions, exiting the ROI, reduced signal strength, a specific command from the user, and the like.

EXAMPLES

A real-world event could be an unplanned emergency event (such as a fire, flash flood, traffic accident, shooting, etc) or a planned non-emergency event (such as a concert, fair, road repair, sporting event, etc) or a combination (such as traffic congestion, road repair and a traffic accident). The origination of the agent and the ROI is not relevant to this disclosure but can differ based on each scenario. Individual examples are detailed in the following paragraphs.

Disaster search and rescue missions could drop in mobile Base Transceiver Stations (BTS) pre-programmed with a specific ROI and Agents to facilitate propagation to other mobiles that are in or enter the ROI. The agent copies itself to devices as they enter the ROI of the search and rescue effort. The agent might provide response leaders with command and control, enabling the command post to identify each participant, observe the location of each participant, assign search tasks to selected participants, and notify participants of status changes. The agent may change status or cease operating when a participant enters a rest area, departs the ROI, or in some other manner ceases to participate in the search and rescue mission. [0035] A 911 dispatcher could submit an Agent and a ROI to a caller's mobile in response to a traffic accident. The participant can use the camera or various other sensor inputs of the mobile device to indicate the type of injury (or injuries) involved. The police and medical responders can use this information, carried by the agent as it copies itself to additional devices as they enter the region, to quickly facilitate their actions (e.g., will Care-Flight be needed because of traffic congestion?, etc). When the agent determines that the participant has exited the ROI, e.g., by comparing the device's current location with the ROI boundary, the agent moves to another device that is entering the ROI, stops participating in the ROI related to the traffic accident and waits for the next event, or ceases operation. The act of copying or moving to a device that is entering the ROI is an example of the agent achieving the goal of persistence within the ROI. [0036] A mobile user can create an Agent and ROI at a crowded concession stand at a sporting event in order to quickly understand the demands for hot dogs drinks, etc based on the crowd's demands. As customers depart the service counter, the agent detects the movement and either moves to a device approaching the concession stand that isn't already running the agent, or if no such device is available, stops operating.

Other scenarios would be apparent to the skilled addressee from the foregoing embodiments and examples.

In the above examples, the point-to-point communication within a region of interest can help to promote a direct, expedient exchange of information between agents. When an agent detects that its host device has left the ROI, it may terminate the agent. An agent's motivation to stay within a specified ROI, e.g. by moving or copying itself to other agents, allows the device to free up resources acquired by the agent after a power cycle or once the device leaves the ROI boundary.

In one embodiment, there may be defined one or more threshold conditions that enable the agent to provide a graceful termination on a device. In one embodiment, a threshold of the ROI may be defined as a second series of coordinates that define a threshold boundary immediately outside of the ROI boundary. Devices at a location between the threshold boundary and the ROI boundary may be considered to be within the threshold.

In one embodiment, a threshold of the ROI may be defined by signal strength. For example, where a ROI is defined by proximity to base stations a device with a signal strength of less than 20% with a base station within the ROI may be considered to be operating within a threshold region. The signal strength may be used to as a threshold condition irrespective of how the ROI is defined, e.g. by coordinates, base stations or by other means. The choice of threshold signal strength, e.g. 20% is presented herein as an example with any suitable threshold being chosen dependent on the application and implementation.

In a further embodiment, a device may be considered to be operating in a threshold region if the battery life of the device is below a required level, e.g. 20%.

Figure 6:
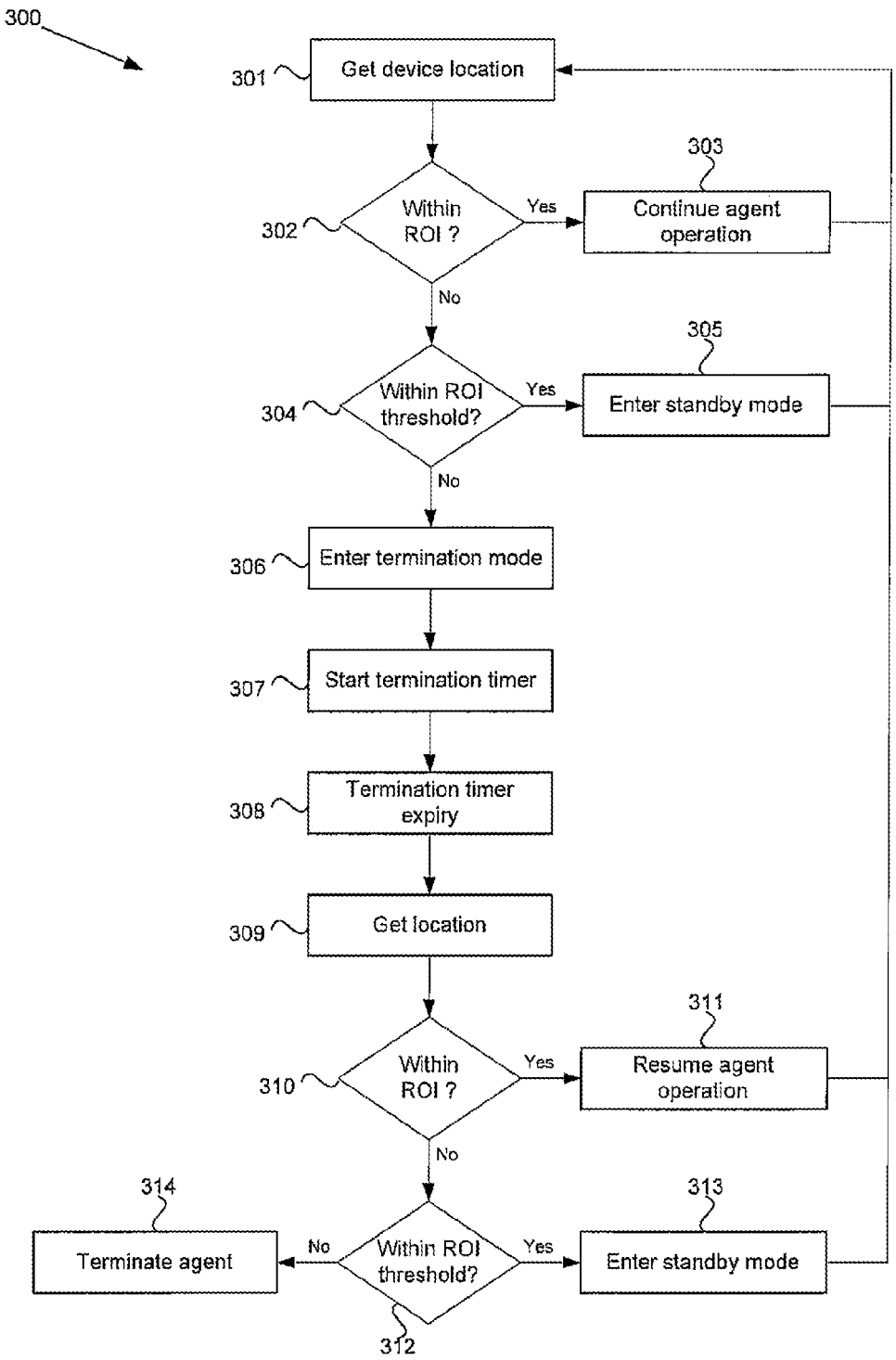
FIG. 6 illustrates a process for terminating an agent on a device.

A process for terminating the agent on a device is shown in the flowchart 300 of FIG. 6. At step 301, the agent is periodically updating the device location. If the agent determines that the device is still comfortably within the ROI (step 302) then normal agent operation continues (step 303). Otherwise the agent may determine if the device is in a geographic threshold region (step 304) and, if so, the agent enters a standby mode (step 305) where the agent actively monitors the device location (step 301) but other agent functions such as data gathering and processing are suspended. In the standby mode, the agent may continue to propagate itself to other devices within the ROI. If step 304 shows the device to be outside of the threshold, then the agent enters a termination mode (step 306) and an optional termination timer is started (step 307). The termination timer provides a final opportunity for the device to re-enter the ROI.

Upon expiry of the termination timer (step 308), or if the termination timer is disabled, a final check of the device location is made (step 309). If the device has re-entered the ROI as determined at step 310, then agent operation is resumed (step 311). If the agent has not re-entered the ROI but is within the ROI threshold, as determined at step 312, then the agent enters the standby mode (step 313). Otherwise, the agent is terminated (step 314), at which time a termination notification message may be broadcast/multicast/unicast to known agents within the ROI.

Where non-geographic threshold conditions are employed, such as based on signal strength and/or device battery power, the agent may enter a standby mode even if the device is within the ROI. Further, more stringent threshold conditions can be applied, such as battery power less than 5%, to cause the agent to enter a termination mode.

Figure 7:
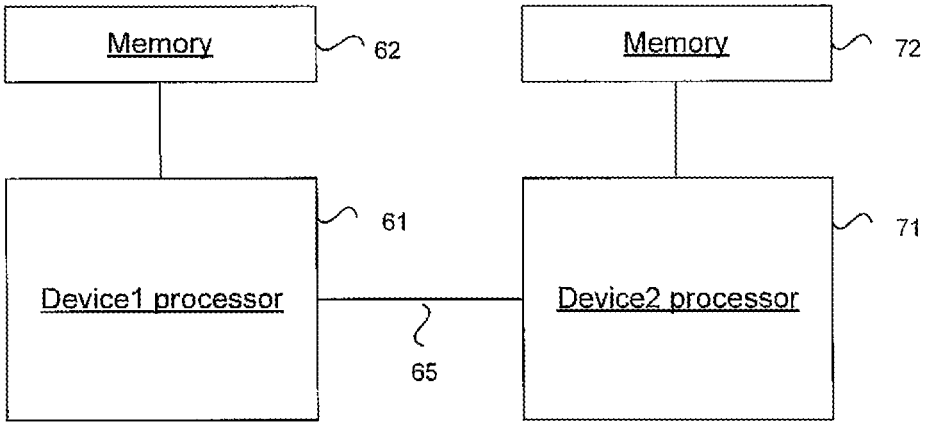
FIG. 7 illustrates a processor and memory of first and second devices.
Figure 8:
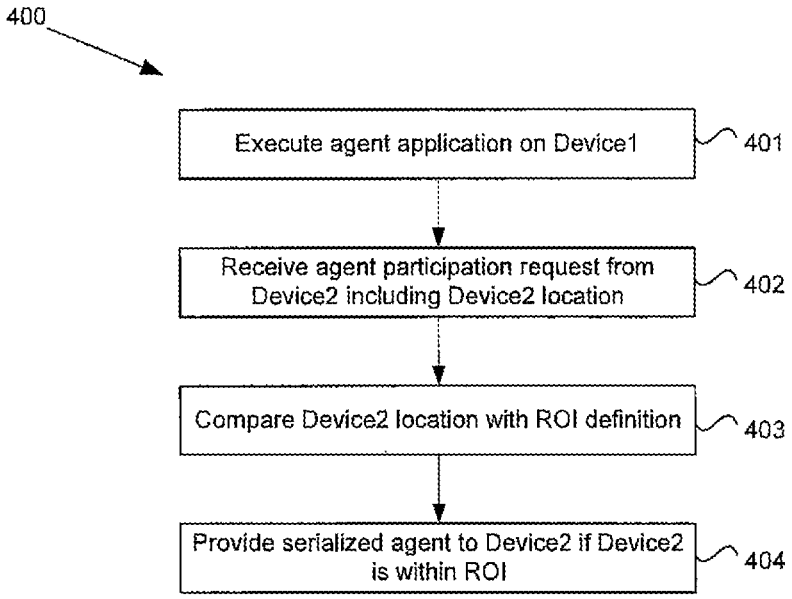
FIG. 8 illustrates an instruction set that can execute on the processor of the first device of FIG. 7.

The components of the system 10 may be embodied in hardware, software, firmware or a combination of hardware, software and/or firmware. In a hardware embodiment, a mobile device such as Device_1 31 may include a processor 61 operatively associated with a memory 62 as shown in FIG. 7. The memory 62 may store an instruction set 400 executable by the processor 61 which may include the bootstrap code described above. The bootstrap code allows the processor 61 to receive an agent application, either from the server 20 or from another mobile device. The instruction set 400, shown in FIG. 8, may include instructions that, when executed, causes the processor 61 to execute the agent application (step 401) which may include storing a definition of the region of interest in the memory 62. When executing, the agent application can receive an agent participation request from a second processor 71 of a second device (step 402), e.g. Device_2 32 (FIG. 3). The agent participation request may be received through a suitable communications link 65, such as a peer-to-peer link or via one or more base stations and/or a server. From the agent participation request, the processor 61 can determine the location of the second device and compare the second device's location with a definition of the region of interest (step 403). If the second device is shown to be within the region of interest, the processor 61 can provide a serialized version of the agent application to the second processor 71 (step 404). The second processor 71, upon receiving the serialized agent application, may deserialize the agent application, store the ROI definition in its respective memory 72 and activate the agent application.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

The invention claimed is:

1. A computer-readable medium comprising computer-executable instructions, that when executed by a processing device, cause the processing device to:

receive, from a first device, an agent activation request comprising a first copy of an agent application executing on the first device;

execute the first copy of the agent application based at least in part on receiving the agent activation request;

transmit, to the first device, a first agent activation response based at least in part on executing the first copy of the agent application;

receive, from a second device, an agent participation request providing a location of the second device;

compare the location of the second device to a region of interest;

provide, to the second device, a second copy of the agent application based at least in part on the comparison;

receive, from the second device, a second agent activation response based at least in part on the second copy of the agent application executing on the second device; and record that the second copy of the agent application is executing successfully on the second device based at least in part on receiving the second agent activation response from the second device within a predetermined amount of time.

2. The computer-readable medium of claim 1, wherein the first agent activation response comprises at least one of a first device identification, an agent application identification, and a success indicator.

3. A device, comprising:

a memory configured to store a first copy of an agent application received from a first device; and a processing device configured to:

execute the first copy of the agent application based at least in part on receiving an agent activation request from the first device, the agent activation request comprising the first copy of the agent application;

transmit, to the first device, a first agent activation response based at least in part on executing the first copy of the agent application;

receive, from a second device, an agent participation request providing a location of the second device;

compare the location of the second device to a region of interest;

provide, to the second device, a second copy of the agent application based at least in part on the comparison;

receive, from the second device, a second agent activation response based at least in part on the second copy of the agent application executing on the second device; and record that the second copy of the agent application is executing successfully on the second device based at least in part on receiving the second agent activation response from the second device within a predetermined amount of time.

4. The device of claim 3, wherein the processing device is further configured to trigger storing the region of interest or agent history in the memory in response to the agent activation request.

5. The device of claim 3, wherein the first agent activation response comprises at least one of a device identification, an agent application identification, and a success indicator.

6. A mobile device, comprising:

a memory device configured to store instructions; and a processing device configured to execute the instructions stored in the memory device to:

activate a first copy of an agent application based at least in part on receiving the first copy of the agent application in an agent activation request from a first device;

transmit, to the first device, a first agent activation response based at least in part on activating the first copy of the agent application;

receive, from a second device, an agent participation request providing a location of the second device;

compare the location of the second device to a region of interest;

provide, to the second device, a second copy of the agent application based at least in part on the comparison;

receive, from the second device, a second agent activation response based at least in part on the second copy of the agent application executing on the second device; and record that the second copy of the agent application is executing successfully on the second device based at least in part on receiving the second agent activation response from the second device within a predetermined amount of time.

7. The mobile device of claim 6, wherein the processing device is configured to execute the instructions stored in the memory device further to transmit the first agent activation response based at least in part on activating the first copy of the agent application after receiving the agent activation request.

8. The mobile device of claim 6, wherein the processing device is configured to execute the instructions stored in the memory device further to terminate execution of the first copy of the agent application in response to detecting that the mobile device is leaving the region of interest.

9. The mobile device of claim 6, wherein the processing device is configured to execute the instructions stored in the memory device further to receive the agent activation request based at least in part on a comparison of a location of the mobile device to the region of interest being within a predetermined threshold.

10. The mobile device of claim 9, wherein the predetermined threshold is based at least in part on a distance between the mobile device and a base station that serves the region of interest.

11. The mobile device of claim 9, wherein the predetermined threshold is based at least in part on a battery power of the mobile device.

12. A method, comprising:

activating a first copy of an agent application based at least in part on receiving the first copy of the agent application from a first device;

[transmitting, to the first device, an agent activation response based at least in part on successfully activating the first copy of the agent application;]

transmitting, to the first device, a first agent activation response based at least in part on activating the first copy of the agent application;

receiving, from a second device, an agent participation request providing a location of the second device;

comparing the location of the second device to a region of interest;

providing, to the second device, a second copy of the agent application based at least in part on the comparison;

receiving, from the second device, a second agent activation response based at least in part on the second copy of the agent application executing on the second device; and recording that the second copy of the agent application is executing successfully on the second device based at least in part on receiving the second agent activation response from the second device within a predetermined amount of time.

13. The method of claim 12, further comprising transmitting the first agent activation response based at least in part on activating the first copy of the agent application after receiving the first copy of the agent [activation request] *application*.

14. The method of claim 12, further comprising terminating execution of the first copy of the agent application in response to detecting that the mobile device is leaving the region of interest.

15. The method of claim 12, further comprising determining that the location of the second device is within a predetermined threshold distance of the region of interest.

16. The method of claim 15, wherein the predetermined threshold distance is based at least in part on a distance between the mobile device and a base station that serves the region of interest.

17. The method of claim 15, wherein the predetermined threshold distance is based at least in part on a battery power of the mobile device.

*18. A mobile management device, comprising a processor configured to:*

*propagate an agent to a first device in response to detecting the first device being located in a region of interest;*

*receive an agent participation request from a second device, the agent participation request indicating a location of the second device;*

*provide an agent activation request comprising deploying the agent to the second device based at least in part on the second device being located in the region of interest; and*

*terminate the agent executing on the first device based at least in part on the agent successfully executing on the second device or place the agent executing on the first device into a stand-by mode based at least in part on the agent successfully executing on the second device.*

*19. The mobile management device of claim 18, wherein the processor is further configured to:*

*compare a location of the second device to the region of interest; and*

*provide the agent to the second device based at least in part on the comparison.*

*20. The mobile management device of claim 23, wherein the processor is further configured to:*

*terminate the agent executing on the first device based at least in part on detecting that the first device is no longer located in the region of interest.*

*21. A system, comprising:*

*a first processor configured to:*

*propagate an agent to a first mobile device in response to detecting the first mobile device being located in a region of interest;*

*receive an agent participation request from a second mobile device, the agent participation request indicating a location of the second mobile device; and*

*provide an agent activation request comprising deploying the agent to the second mobile device based at least in part on the second mobile device being located in the region of interest; and*

*a second processor configured to activate the agent on the second mobile device before providing an agent activation response to the first mobile device.*

*22. The mobile management device of claim 18, wherein the processor is further configured to:*

*propagate the agent to the first device in response to detecting the first device being located in the region of interest within a predetermined threshold.*

*23. A mobile management device, comprising a processor configured to:*

*propagate an agent to a first device in response to detecting the first device being located in a region of interest within a predetermined threshold;*

*receive an agent participation request from a second device, the agent participation request indicating a location of the second device;*

*provide an agent activation request comprising deploying the agent to the second device based at least in part on the second device being located in the region of interest; and*

*determine the predetermined threshold based at least in part on a distance between the first device and a base station that serves the region of interest.*

*24. A mobile management device, comprising a processor configured to:*

*propagate an agent to a first device in response to detecting the first device being located in a region of interest within a predetermined threshold;*

*receive an agent participation request from a second device, the agent participation request indicating a location of the second device;*

*provide an agent activation request comprising deploying the agent to the second device based at least in part on the second device being located in the region of interest; and*

*determine the predetermined threshold based at least in part on a battery power of the first device.*

*25. A mobile device, comprising a processor to execute instructions stored in a memory to:*

*execute an agent on a first device in response to detecting the first device being located in a region of interest;*

*receive an agent participation request from a second device, the agent participation request indicating a location of the second device;*

*provide the agent to the second device based at least in part on the second device being located in the region of interest; and*

*record that the agent is executing successfully on the second device based at least in part on receiving an agent activation response from the second device within a predetermined amount of time.*

*26. The mobile device of claim 25, wherein the processor is further configured to:*

*provide the agent to the second device comprised in an agent activation request.*

*27. The mobile device of claim 25, wherein the processor is further configured to:*

*compare a location of the second device to the region of interest; and*

*provide the agent to the second device based at least in part on the comparison.*

*28. The mobile device of claim 25, wherein the processor is further configured to:*

*terminate the agent executing on the first device based at least in part on the agent successfully executing on the second device.*

*29. The mobile device of claim 25, wherein the processor is further configured to:*

*terminate the agent executing on the first device based at least in part on detecting that the first device is no longer located in the region of interest.*

*30. The mobile device of claim 25, wherein the processor is further configured to:*

*activate the agent on the second device before providing the agent activation response.*

*31. The mobile device of claim 25, wherein the processor is further configured to:*

*propagate the agent to the first device in response to detecting the first device being located in the region of interest within a predetermined threshold.*

*32. The mobile device of claim 31, wherein the processor is further configured to:*

*determine the predetermined threshold based at least in part on a distance between the first device and a base station that serves the region of interest.*

*33. The mobile device of claim 25, wherein the processor is further configured to:*

*determine the predetermined threshold based at least in part on a battery power of the first device.*

*34. The mobile management device of claim 21, wherein the first processor is further configured to:*

*compare a location of the second device to the region of interest; and*

*provide the agent to the second device based at least in part on the comparison.*

*35. The mobile management device of claim 24, wherein the processor is further configured to:*

*terminate the agent executing on the first device based at least in part on detecting that the first device is no longer located in the region of interest.*

* * * * *